(12) United States Patent
Lam

(10) Patent No.: US 7,933,513 B2
(45) Date of Patent: Apr. 26, 2011

(54) SYSTEM FOR DUPLICATING RADIOGRAPHIC FILM IMAGES

(76) Inventor: Anthony Lam, Chicago, IL (US)

(*) Notice: Subject to any disclaimer, the term of this patent is extended or adjusted under 35 U.S.C. 154(b) by 1302 days.

(21) Appl. No.: 11/497,591

(22) Filed: Aug. 2, 2006

(65) Prior Publication Data

US 2007/0036529 A1 Feb. 15, 2007

Related U.S. Application Data

(60) Provisional application No. 60/707,042, filed on Aug. 10, 2005.

(51) Int. Cl.
*G03B 17/48* (2006.01)
*G03B 19/00* (2006.01)
*G03B 27/62* (2006.01)
*H04N 5/253* (2006.01)

(52) U.S. Cl. .............. 396/429; 355/75; 348/96

(58) Field of Classification Search .......... 396/500, 396/5, 419, 375, 428, 429, 544; 348/96, 348/375, 552; 358/506, 487, 482, 483
See application file for complete search history.

(56) References Cited

U.S. PATENT DOCUMENTS

| | | | | |
|---|---|---|---|---|
| 1,837,704 A * | 12/1931 | Dean | ................. | 355/75 |
| 3,514,206 A * | 5/1970 | Harvey et al. | ................. | 355/67 |
| 4,222,654 A * | 9/1980 | Bodenhamer | ................. | 396/428 |
| 4,660,091 A * | 4/1987 | Nutting | ................. | 348/96 |
| 5,218,439 A * | 6/1993 | Mizoguchi et al. | ................. | 348/96 |
| 5,293,242 A * | 3/1994 | Mamiya | ................. | 348/362 |
| 5,757,430 A * | 5/1998 | Maeda et al. | ................. | 348/373 |
| 5,767,989 A * | 6/1998 | Sakaguchi | ................. | 358/474 |
| 5,898,790 A | 4/1999 | Laurence | | |
| 5,950,017 A * | 9/1999 | Reff | ................. | 396/14 |
| 6,052,534 A * | 4/2000 | Goto | ................. | 396/71 |
| 6,339,447 B1 * | 1/2002 | Kurahashi et al. | ................. | 348/96 |
| 6,424,699 B1 | 7/2002 | Weinger | | |
| 6,501,827 B1 | 12/2002 | Takasawa | | |
| 6,540,415 B1 * | 4/2003 | Slatter et al. | ................. | 396/428 |
| 6,710,321 B2 | 3/2004 | Yamaguchi | | |
| 6,856,707 B2 | 2/2005 | Enomoto | | |
| 6,931,421 B2 | 8/2005 | Akagi | | |
| 6,972,425 B2 | 12/2005 | Tamakoshi et al. | | |
| 6,975,778 B1 | 12/2005 | Loce et al. | | |
| 7,020,352 B2 | 3/2006 | O'Callaghan et al. | | |
| 7,092,005 B2 * | 8/2006 | Takanashi | ................. | 348/96 |
| 7,185,206 B2 * | 2/2007 | Goldstein | ................. | 713/189 |

(Continued)

FOREIGN PATENT DOCUMENTS

EP 1517269 3/2005

(Continued)

OTHER PUBLICATIONS

Dr. Lorne Lavine, DMD, Why Every Office Needs to be Digital, Sidekick, Spring 2006, 8 pp., Sullivan-Schein.

(Continued)

*Primary Examiner* — W. B. Perkey
*Assistant Examiner* — Noam Reisner
(74) *Attorney, Agent, or Firm* — Olson & Cepuritis, Ltd.

(57) ABSTRACT

A film copy system includes a camera supported by a cradle which is removably attached to a cradle mount. A light shaft carried by the cradle is provided for releasably engaging a film holder and spacing the film holder a predetermined distance from the camera.

18 Claims, 16 Drawing Sheets

U.S. PATENT DOCUMENTS

| | | | |
|---|---|---|---|
| 7,194,200 B1 * | 3/2007 | Behlow | 396/5 |
| 2002/0094119 A1 | 7/2002 | Sahadevan | |
| 2004/0029068 A1 | 2/2004 | Sachdeva et al. | |
| 2004/0119830 A1 * | 6/2004 | Su et al. | 348/207.99 |
| 2004/0136502 A1 | 7/2004 | Munoz-Ferrada et al. | |
| 2004/0247123 A1 | 12/2004 | Goldstein | |
| 2005/0134936 A1 | 6/2005 | Haug et al. | |
| 2005/0275911 A1 | 12/2005 | Yamada et al. | |
| 2006/0072799 A1 | 4/2006 | McLain | |
| 2006/0074721 A1 | 4/2006 | Cotthingham et al. | |

FOREIGN PATENT DOCUMENTS

| | | |
|---|---|---|
| JP | 2005286730 | 10/2005 |
| WO | WO 2006/007123 | 1/2006 |
| WO | WO 2006/015216 | 2/2006 |

OTHER PUBLICATIONS

Flow X-Ray Corporation, New Image Box, Apr. 24, 2006, 2 pp.
RF America Inc., All-In-One Digital Imaging System, Jun. 2005, 6 pp.

* cited by examiner

SYSTEM FOR DUPLICATING RADIOGRAPHIC FILM IMAGES

RELATED APPLICATION

This application is based on a previously filed U.S. provisional patent application Ser. No. 60/707,042 filed Aug. 10, 2005.

FIELD OF THE INVENTION

The present invention relates to the duplication of film images such as radiograms used in the healing arts.

BACKGROUND OF THE INVENTION

In the medical and dental fields, there are frequent occasions when duplication of x-ray radiographic films is necessary, such as when sending a copy to an insurer or another medical professional. Outside of the healing arts, x-ray images have other applications, such as when metal pipe welds are x-rayed to determine the ability of the pipe weld to seal, or when riveted steel is x-rayed to determine the quality of the fastenings, or again, in the construction of reaction chambers in nuclear power plants.

Currently, duplication of radiograms requires wet chemistry processing and special equipment, which is time consuming and expensive. According to current duplicating methods, the original x-ray film is first placed on top of the duplicating film, both are then placed under a light source and exposed (to light) for a set amount of time. The duplicating film is then developed like the original film in a dark room or automatic x-ray developer. In the case of medical and dental radiograms, for example, this is expensive for patients, time consuming and requires training for staff members. In addition, the duplicates must be produced one at a time, which is impractical and slow when large numbers of duplicates are needed. Lastly, the duplicated radiograms are not digital and must be delivered via non-electronic methods, which is also time consuming and costly. Moreover, if the quality of the duplicate is unsatisfactory, the entire process must be repeated individually until a copy of sufficient quality results. The same issues apply to the duplication of x-ray films for structural and industrial purposes.

Because of these drawbacks, it is a common practice to make simple photocopies of the radiograms, which are relatively inexpensive and can be conveniently digitized or produced in paper form. The photocopies, however, suffer greatly in resolution and overall quality, such that the photocopies are frequently not suitable for the intended purpose. This often causes delays in processing insurance payments, and requires consulting professionals to retake medical x-rays and patients to undergo exposure a second time. In the case of industrial x-rays, the time to re-shoot and process the x-rays, and the cost of obtaining the x-rays a second time, can be considerable.

Over the years, various attempts have been made to provide systems for copying photographic and similar films such as radiograms. In United States published patent application 2004/0247123 A1, a method for transmitting digitized images includes a camera mounted above a light source on which a radiograph is placed. The camera is operated to obtain a digital image of the radiograph, which is sent to a digital computer for transmission to a remote site. No provision is made for aligning the camera to the radiograph, and a wide range of adjustment of camera settings is required for radiographs of widely differing sizes.

U.S. Pat. No. 6,856,707 provides an image processing method in which a strip of film is placed between a light diffuser and a lens which guides an image of a portion of the film toward an analog-to-digital converter, which is then processed in a detailed manner to enhance the information acquired. No provision is made for readily adapting the system to a wide range of film image sizes and no provision is made for altering the position of the image acquiring components to adjust for different image types.

PCT International publication number WO 2006/015216 A2 discloses a method for conversion and reproduction of film images through a digital process. A film is scanned and directed to a digital intermediate process in which a negative is created for duplication via a continuous contact printer. No provision is made for adapting the system to accommodate films of different sizes, or to adjust the system to accommodate films of different types.

Accordingly, improvements are still desired to overcome the above-mentioned inadequacies as well as other problems encountered in a typical business environment such as a dental office or other facilities of a healthcare provider. A need for an improved digital copying system remains.

SUMMARY OF THE INVENTION

The present invention provides a novel and improved system for duplicating radiographic film images that minimizes the disadvantages associated with prior art systems and provides advantages in construction, mode of operation and use. One embodiment of the system comprises a base, a camera and a cradle mount slidably supported by the base. A cradle removably attached to the cradle mount supports the camera. Also included is a film holder and a light shaft carried by the cradle for releasably engaging the film holder and spacing the film holder a predetermined distance from the camera.

Another embodiment of the invention comprises a film copy system including a base, a camera and a mounting member for rotatably and slidably mounting the camera to the base. Also included is a film holder and a light shaft carried by the cradle, for releasably engaging the film holder and spacing the film holder a predetermined distance from the camera.

In a further embodiment of the invention, a film copy system includes a camera, a film holder and a cradle comprising a platform defining an aperture and a bracket for mounting the camera to the platform, aligned with the aperture. A light shaft is carried by the cradle so as to be aligned with the aperture and for releasably engaging the film holder and spacing the film holder a predetermined distance from the camera. Both the film holder and light shaft include cooperating index guides to align the film holder relative to the light shaft. A variety of light shafts and film holders can be employed with the same cradle to provide a convenient size change in the image photographically captured. In this manner, different output devices coupled to the camera can be conveniently accommodated. For example, a "standard" x-ray can be enlarged to fit a desired photo printer output size.

DESCRIPTION OF THE PREFERRED EMBODIMENTS

Figure 1:
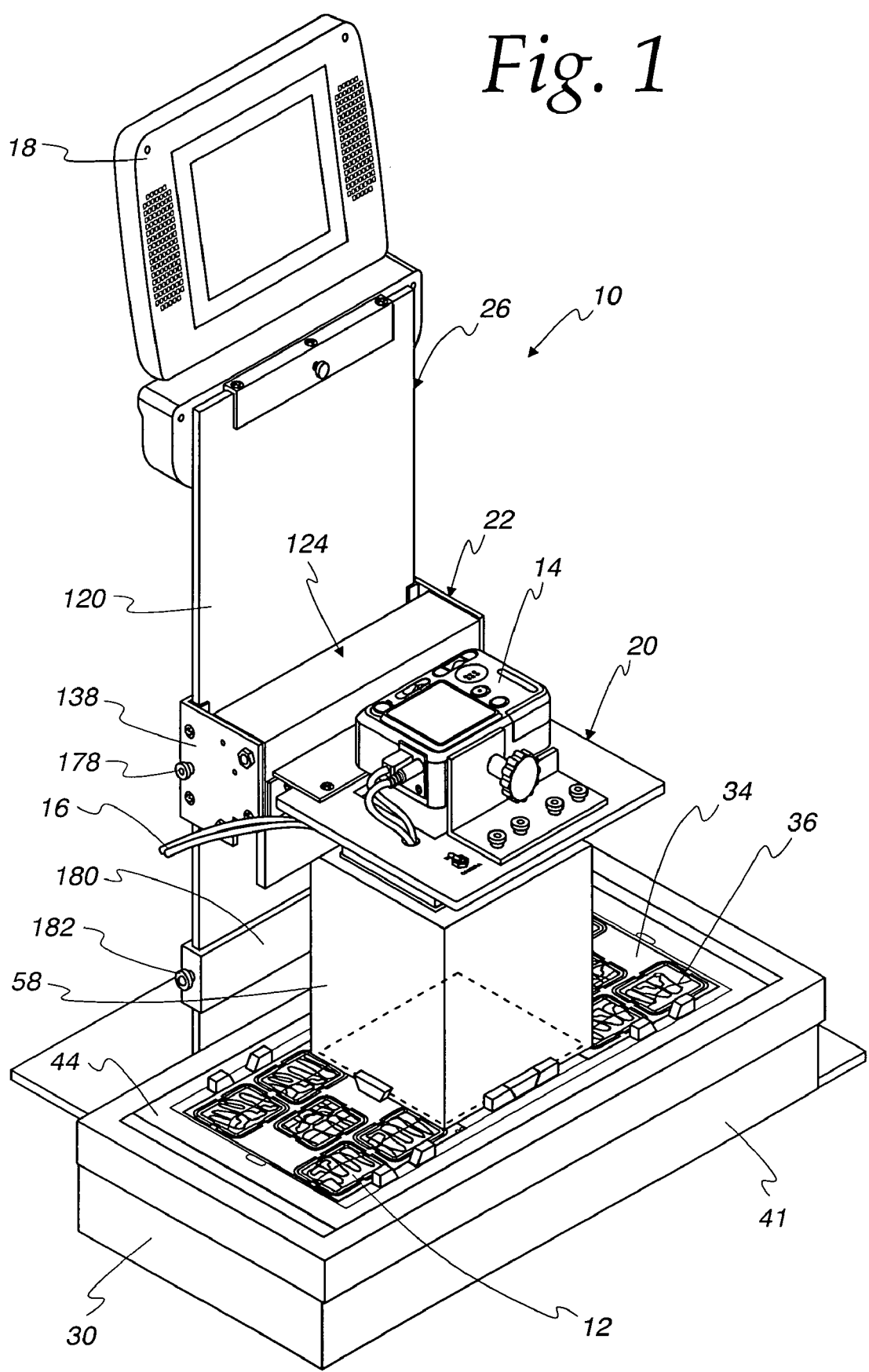
FIG. 1 is a perspective view of a film copy system.

The invention disclosed herein is, of course, susceptible to embodiment in many forms. Shown in the drawings and described herein below in detail are preferred embodiments of the invention. It is understood, however, that the present disclosure is an exemplification of the principles of the invention and does not limit the invention to the illustrated embodiment.

For ease of description, a film copy system embodying the present invention is described in its usual assembled position as shown in the accompanying drawings. Terms such as inner, outer, upper, lower, horizontal, longitudinal, etc. may be used herein with reference to this usual position. However, the film copy system may be manufactured, transported, sold or used in orientations other than as described and shown herein.

Referring now to FIGS. 1, 4-9 and initially to FIG. 1, apparatus embodying the present invention provides a film copy system, generally indicated at 10, for photographically copying one or more films of mount 12 with a camera 14 connected through cables 16 to equipment, not shown, such as a power supply and a graphic storage device. Cables 16 may be employed, for example, to connect the output of camera 14 to an optional display monitor 18 which is supported by back 120. Monitor 18 is preferably of a lightweight type, such as a monitor having an LCD screen. Some of the sub-assemblies of film copy system 10 include a cradle assembly generally indicated at 20, a cradle mount assembly generally indicated at 22, a support generally indicated at 26 and a light source 30.

Light source 30 includes a translucent top 34 and one or more illumination devices such as lamps contained within an outer enclosure 41. Light source 30 is chosen for use with radiographic film 36, sometimes referred to radiograms or "x-ray images". As will be appreciated by those in the healthcare and photographic industries, the film 36, in general, typically comprises a gray scale image having substantial optically dense portions. Accordingly, if fine detail is to be discerned in the films being examined, a sufficiently bright source of illumination is employed. If desired, illumination source 30 can be provided with varying color illumination and varying illumination intensities as may be desirable for a particular application.

Figure 20:
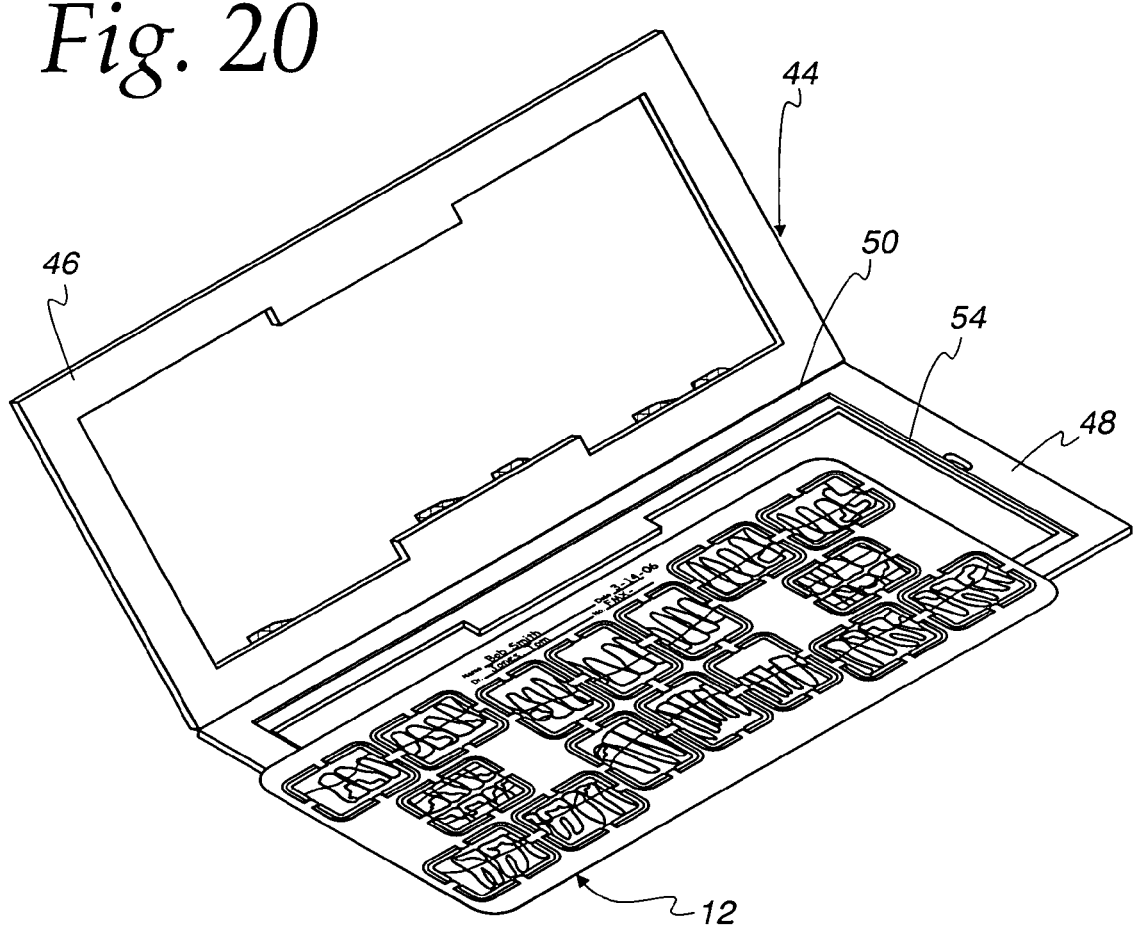
FIG. 20 is a perspective view of a film frame assembly with a set of mounted full mouth x-rays.
Figure 21:
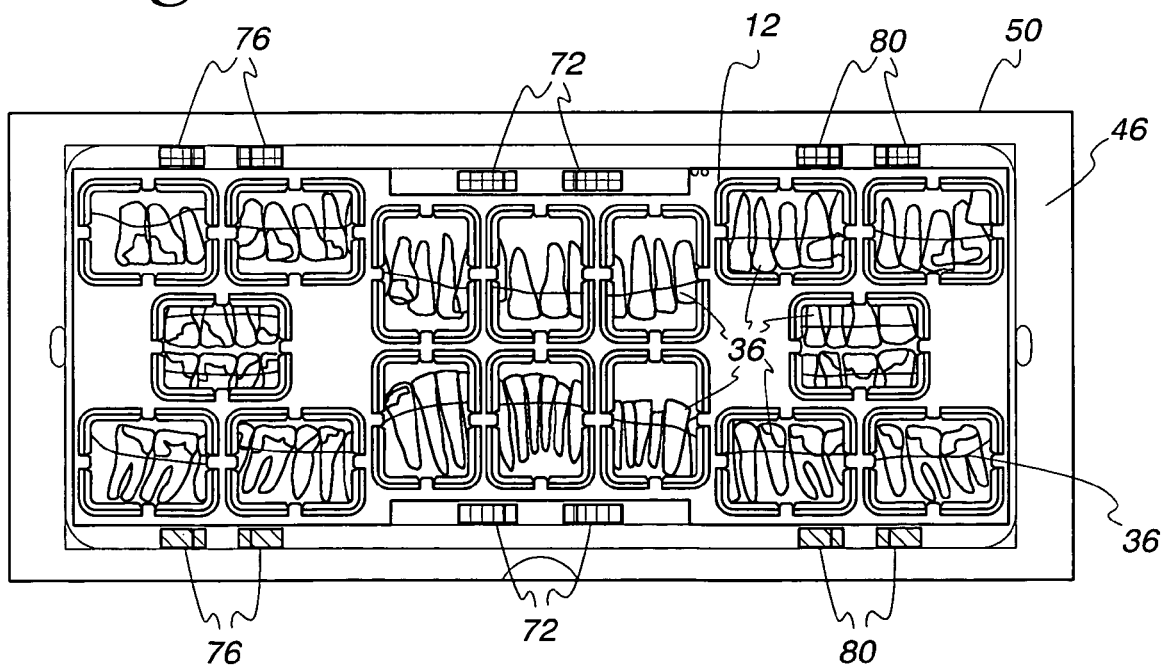
FIG. 21 is a perspective view thereof with the frame shown receiving a film mount.

The present invention has found immediate application in the healthcare field, and more particularly, the dental field for use in the offices of a care provider which typically is located remote from a hospital, laboratory or other diagnostic facility. Accordingly, it is important that a healthcare provider, such as a dentist or dental staff member, be able to quickly and easily duplicate the radiographic images contained in film 36. As shown in the drawings and especially in FIGS. 20 and 21, a plurality of radiographic images or radiograms are assembled in a common film mount 12, and arranged to suggest a patient's 3-dimensional dental structure. For example, the film mount 12 shown in FIGS. 20 and 21 depicts a "full mouth" radiographic image for a particular patient. In the example illustrated, 16 separate radiographic films 36 are assembled about film mount 12, according to a prescribed pattern.

The present invention provides a simple, easy to use expedient for photographically copying one or more radiographic images displayed in the film mount 12. Shown in FIGS. 20 and 21 is a film holder generally indicated at 44 comprising a pair of frames 46, 48 hinged together at 50 so as to be configurable between an open position shown in FIG. 20 and a closed position shown in FIG. 21. Referring to FIG. 20, the lower frame 48 includes a lip 54 within which film mount 12 is nested for accurate positioning. After the film mount is installed, the frames 46, 48 are swung one on top of the other to close the film holder 44, as illustrated in FIG. 21.

Figure 3:
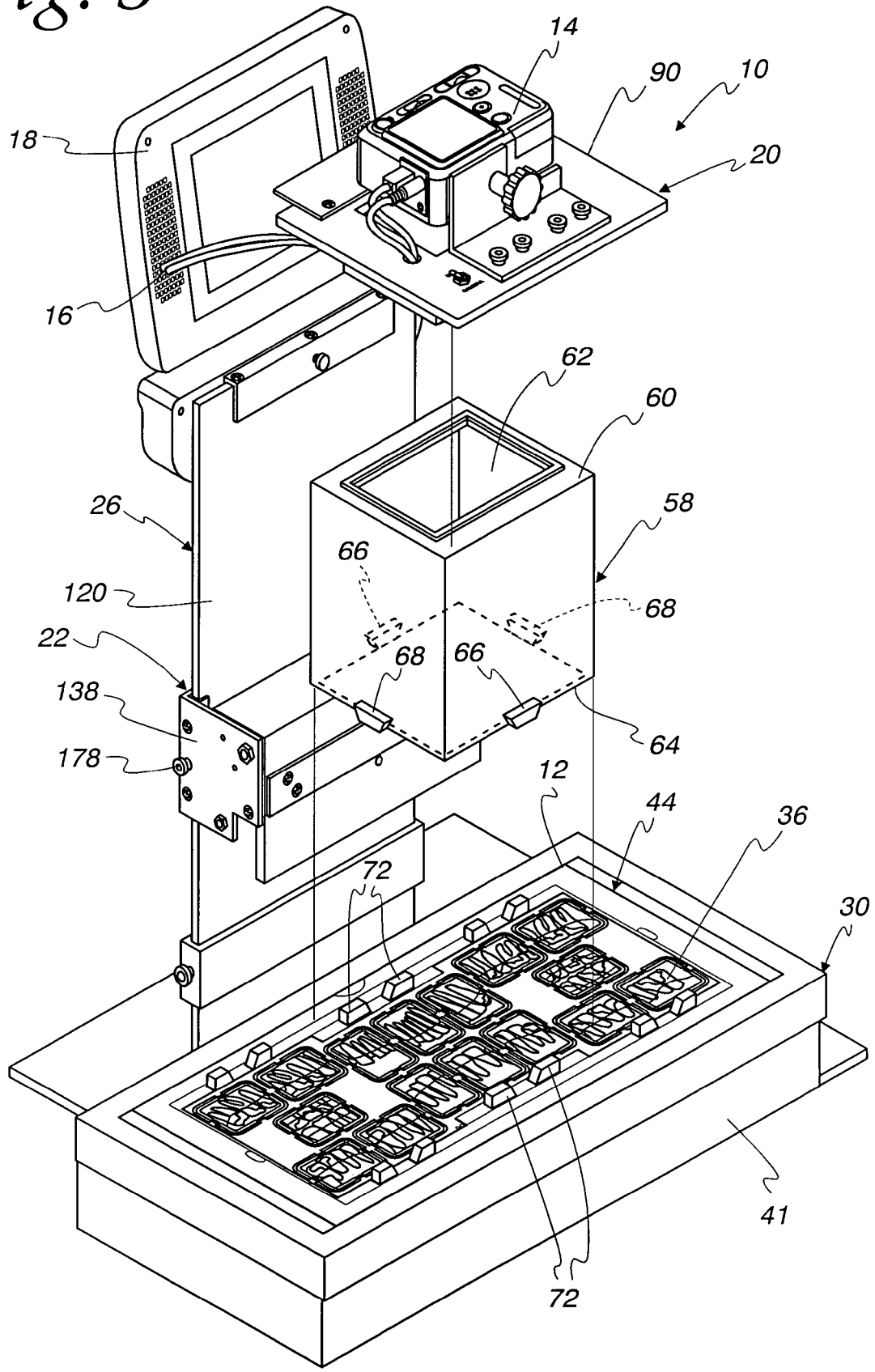
FIG. 3 is an exploded perspective view of the film copy system.
Figure 4:
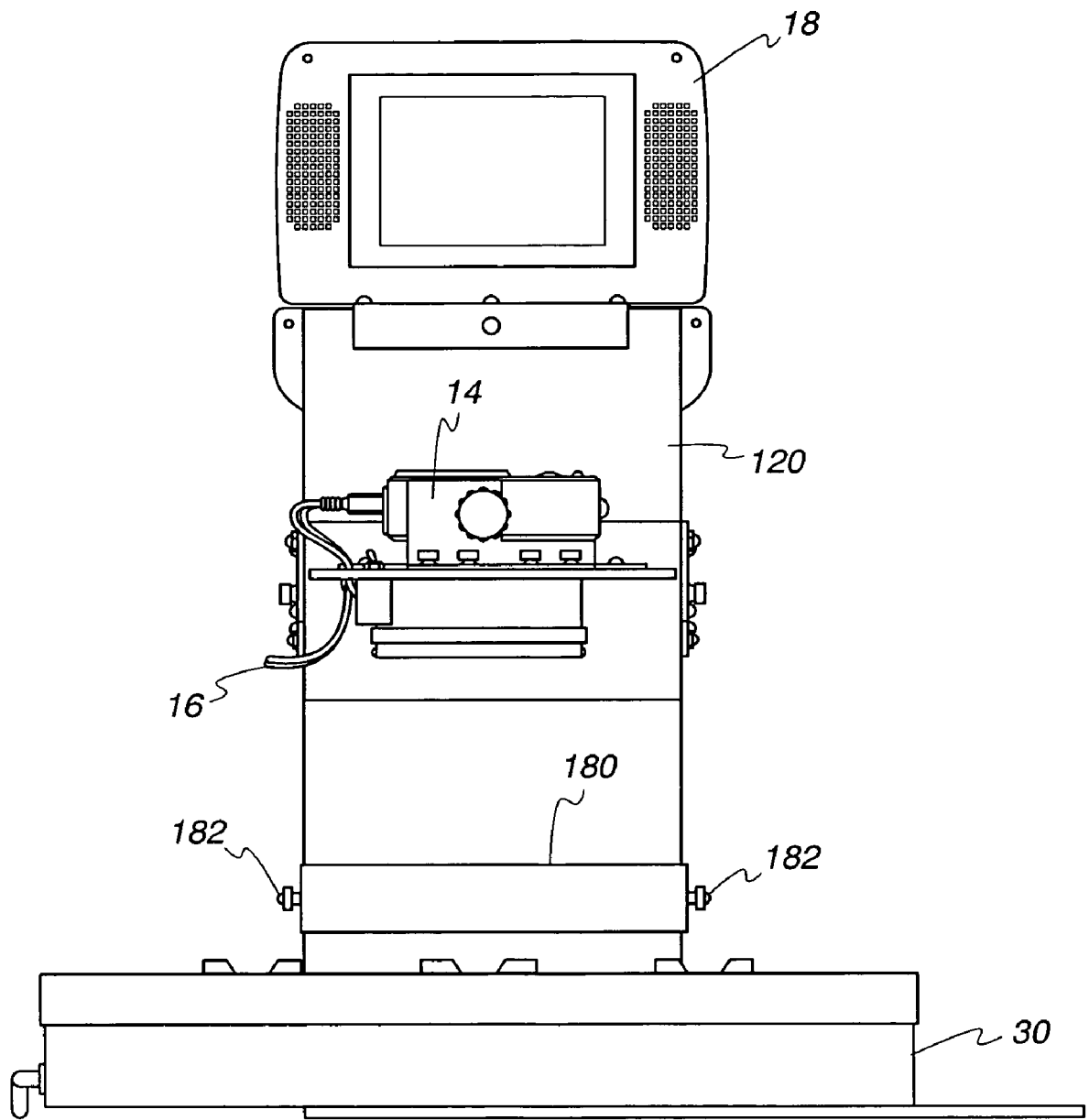
FIG. 4 is a front elevational view of the camera system.
Figure 5:
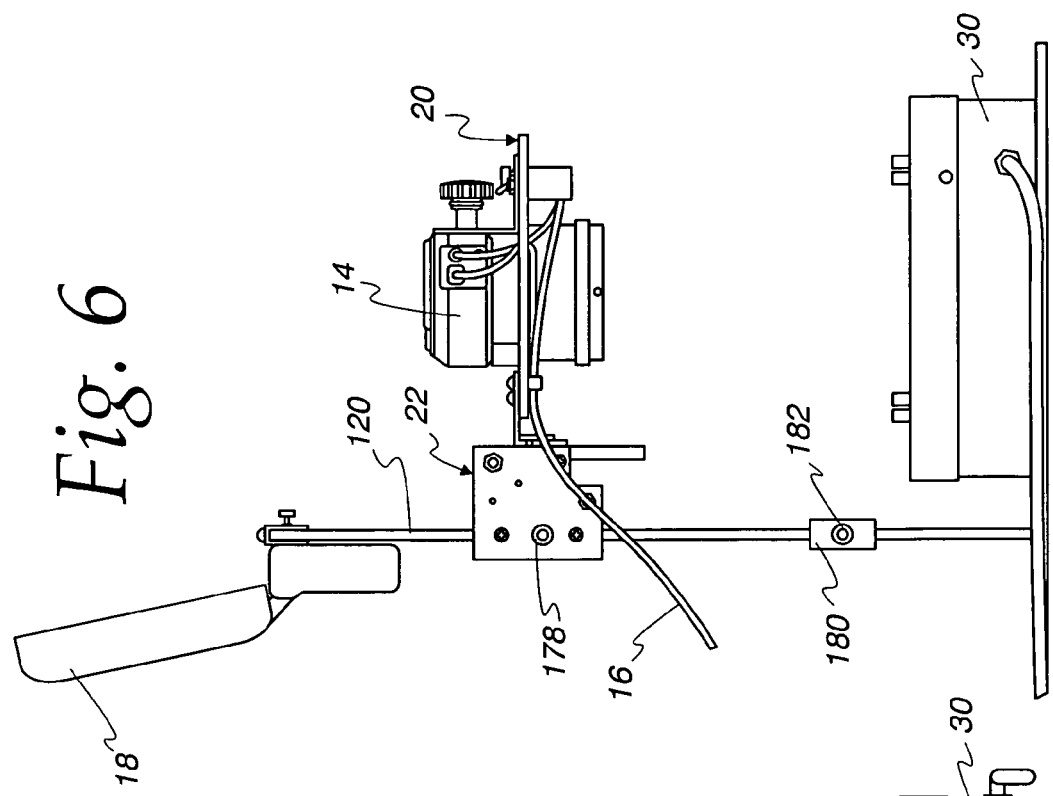
FIG. 5 is a rear elevational view thereof.
Figure 6:
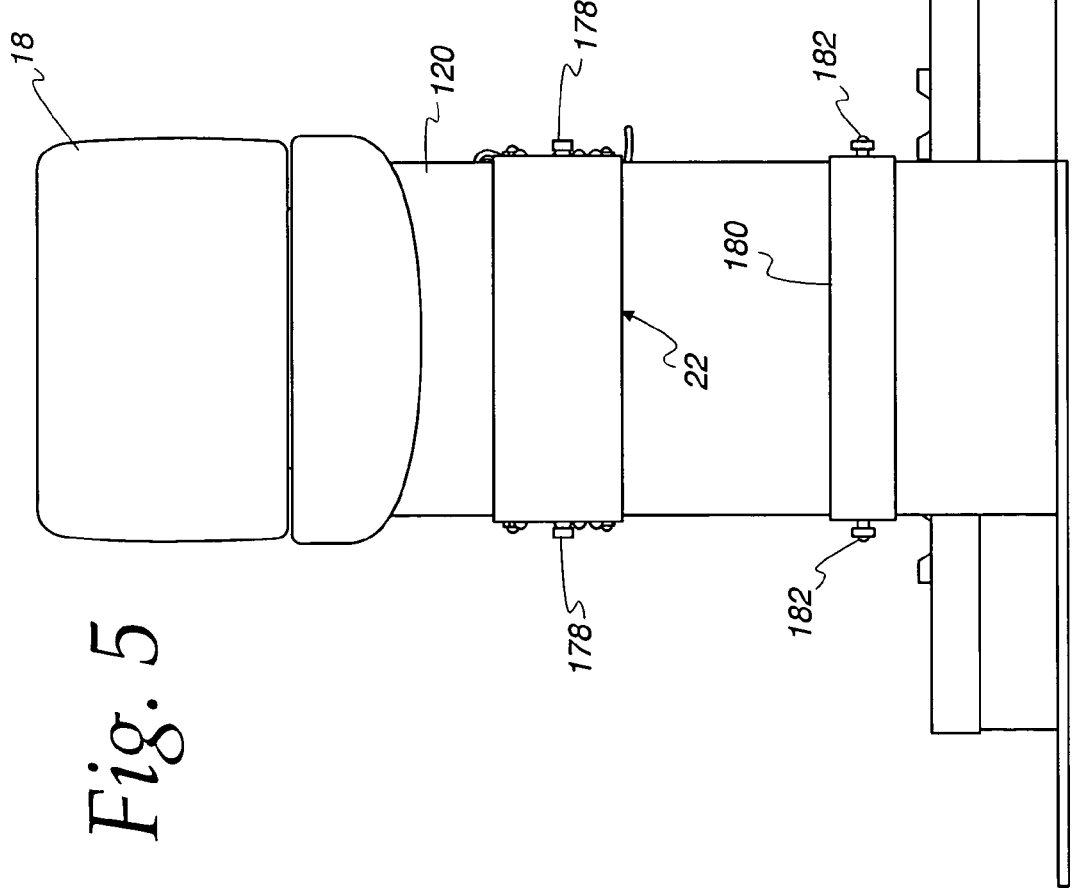
FIG. 6 is a side elevational view thereof.
Figure 7:
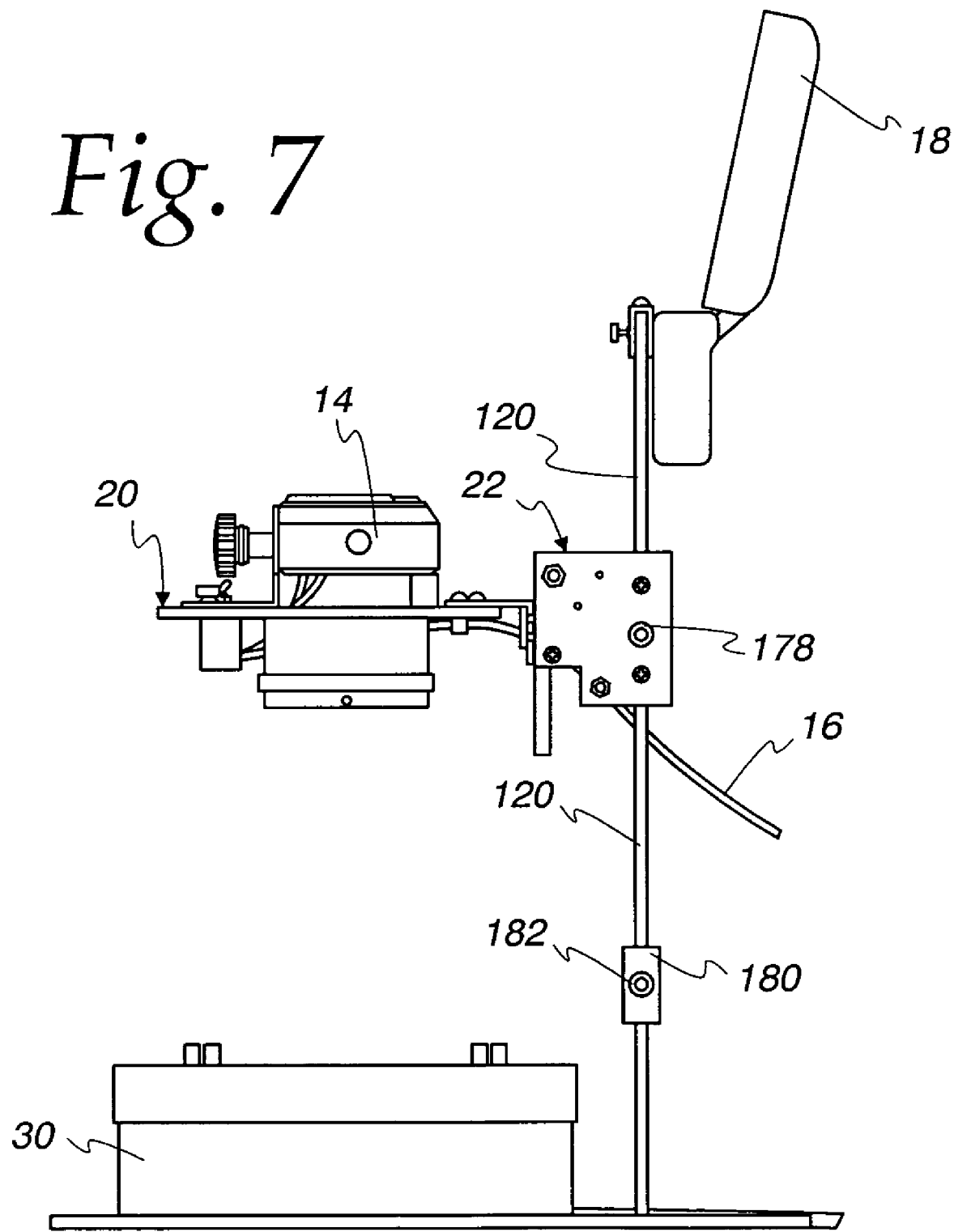
FIG. 7 is another side elevational view thereof.
Figure 8:
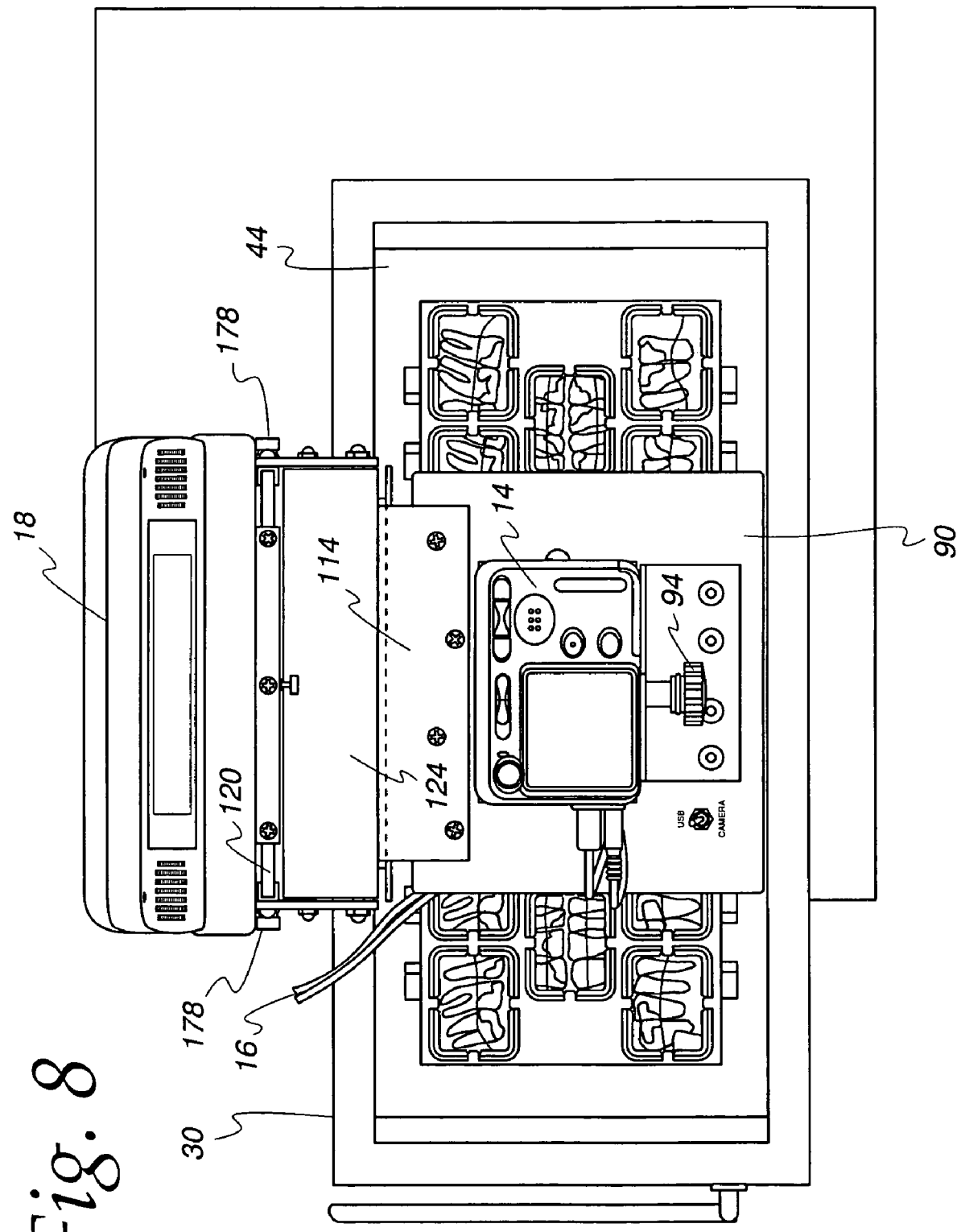
FIG. 8 is a top plan view thereof.
Figure 9:
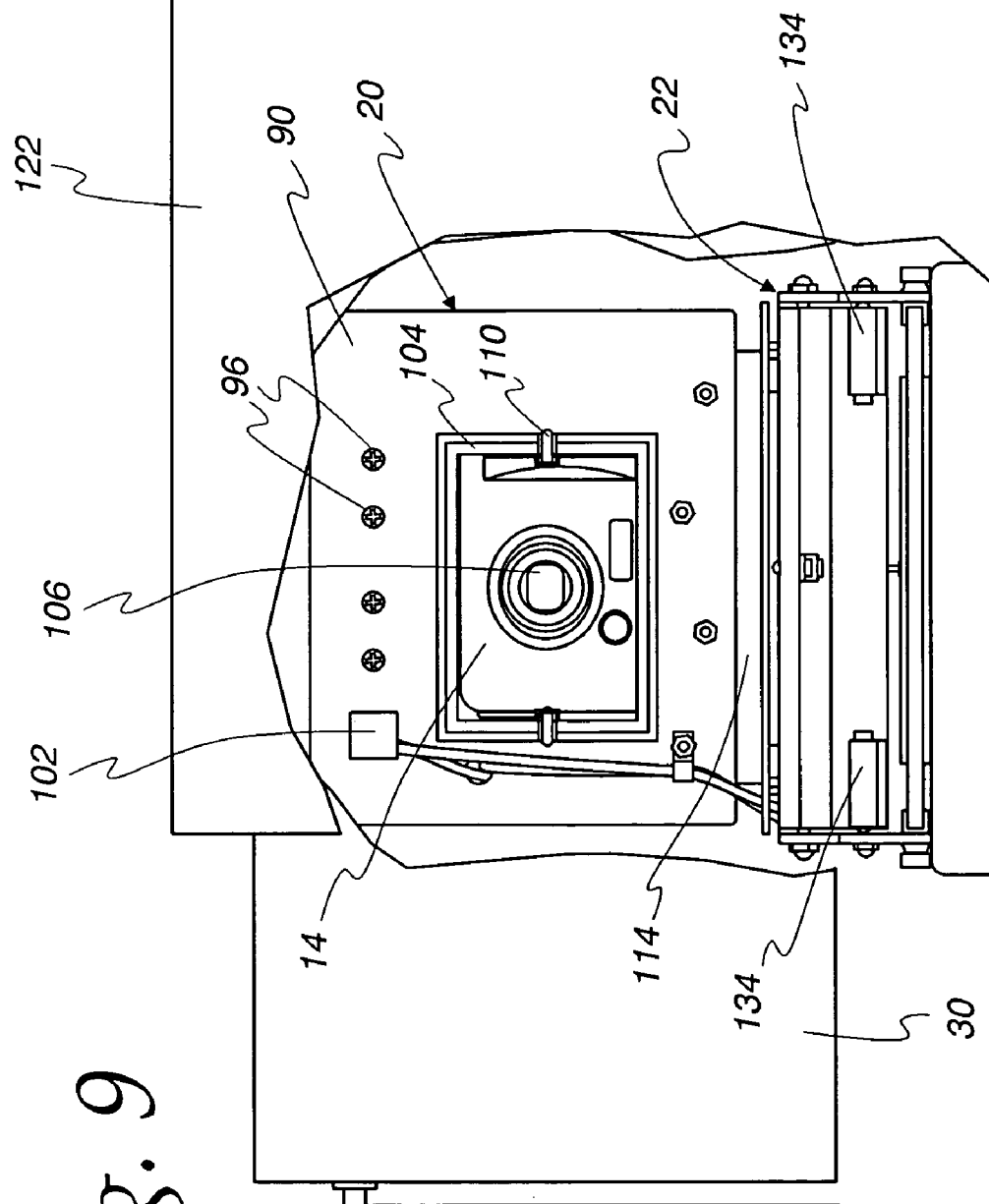
FIG. 9 is a bottom plan view thereof.
Figure 19:
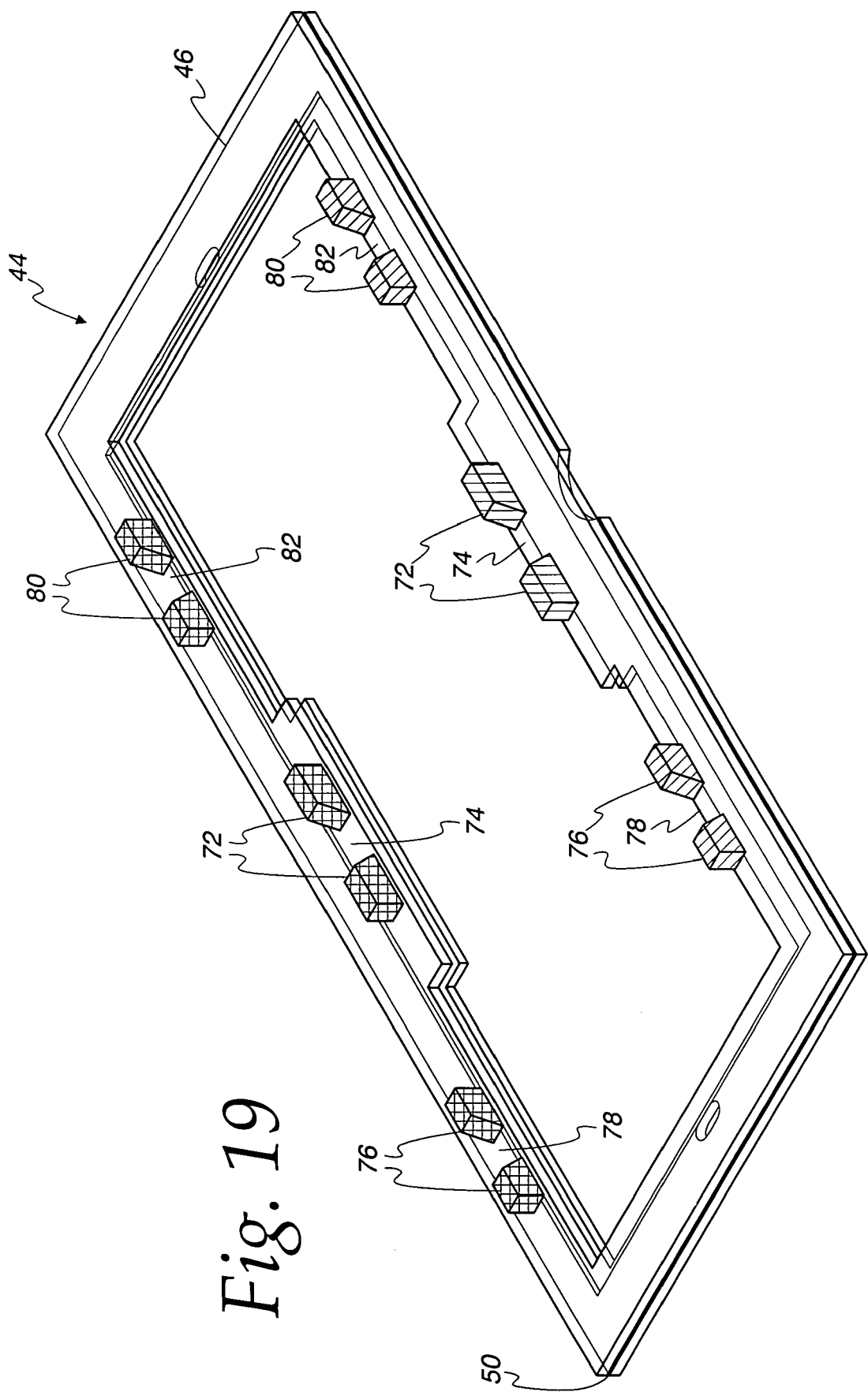
FIG. 19 is a perspective view of a film frame assembly.

Referring now to FIG. 3, film copy system 10 includes a light shaft or shroud 58 having an upper end 60 defining an opening 62 and a lower end 64 carrying a plurality keystone-shaped index guides 66. With additional reference to FIG. 19, film holder 44 carries multiple pairs of indexing guides on the upper frame 46. The indexing guides include central indexing guide pairs 72, each pair defining a medial opening 74 defined by opposed beveled faces of the index guides. On the left hand portion of film holder 44, as seen in FIG. 19, lateral index guide pairs 76 are located, each defining a medial opening 78. At the opposed, right hand end of film holder 44 as shown in FIG. 19, two additional lateral index guide pairs 80 are provided having opposed beveled faces defining a medial opening 82.

With reference to FIGS. 3 and 19, the index guides on shroud 58 and film holder 44 cooperate to provide multiple orientations or alignments between the shroud and the film holder. For example, index guide 66 on shroud 58 (see FIG. 3) mates with central index guide pairs 72 (see FIGS. 3 and 19) to provide a quick and easy alignment of shroud 58 about a predetermined arrangement of films 36 carried on film mount 12 disposed within film holder 44. As indicated, for example, in FIG. 3, shroud 58 has a rectangular form such that top opening 62 is elongated in a direction extending between index guides 68. Accordingly, the desired orientation of shroud 58 with respect to the central group of six films 36 is established by mating the index guides 66 with the central index guides pairs 72.

With reference to FIG. 21, it can be seen that the central group of six films 36 forms an array which is elongated along the longer side of top frame 46. In contrast, the lateral groups of five films 36 located at either end of frame 46 are elongated in a direction parallel to a short side of frame 46. Accordingly, shroud 58 must be rotated 90 degrees when copying either lateral group of five films. With reference to FIGS. 3 and 21, when copying the left hand lateral group of films, index guides 68 of shroud 58 are received by lateral index guide pairs 76.

It is generally preferred that the index guides 66 and 68 of shroud 58 are dimensioned differently so that index guide 66 does not mate with lateral index guide pairs 76 or 80, and so that index guide 68 does not mate with central index guide pairs 72. Similarly, index guide 68 is mated with lateral index guide pairs 80 to accurately position shroud 58 over the group of five films located at the right hand portion of FIG. 21. As will be seen herein, shroud 58 provides convenient accurate alignment for variously positioning camera 14 in alignment with the film groups of film mount 12, carried by film holder 44. The shroud 58 may be formed of any suitable material such as metal or plastic and when formed of materials such as plastic, may be either transparent, translucent or opaque.

Figure 10:
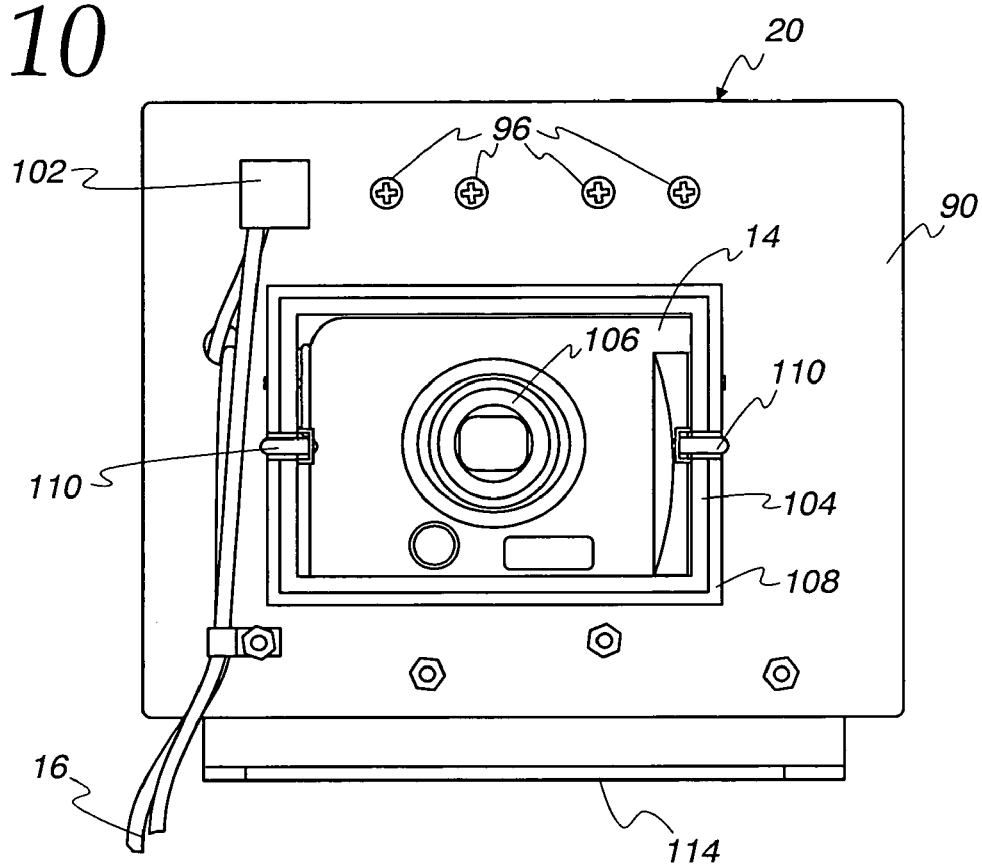
FIG. 10 is a bottom plan view of the camera cradle assembly.
Figure 11:
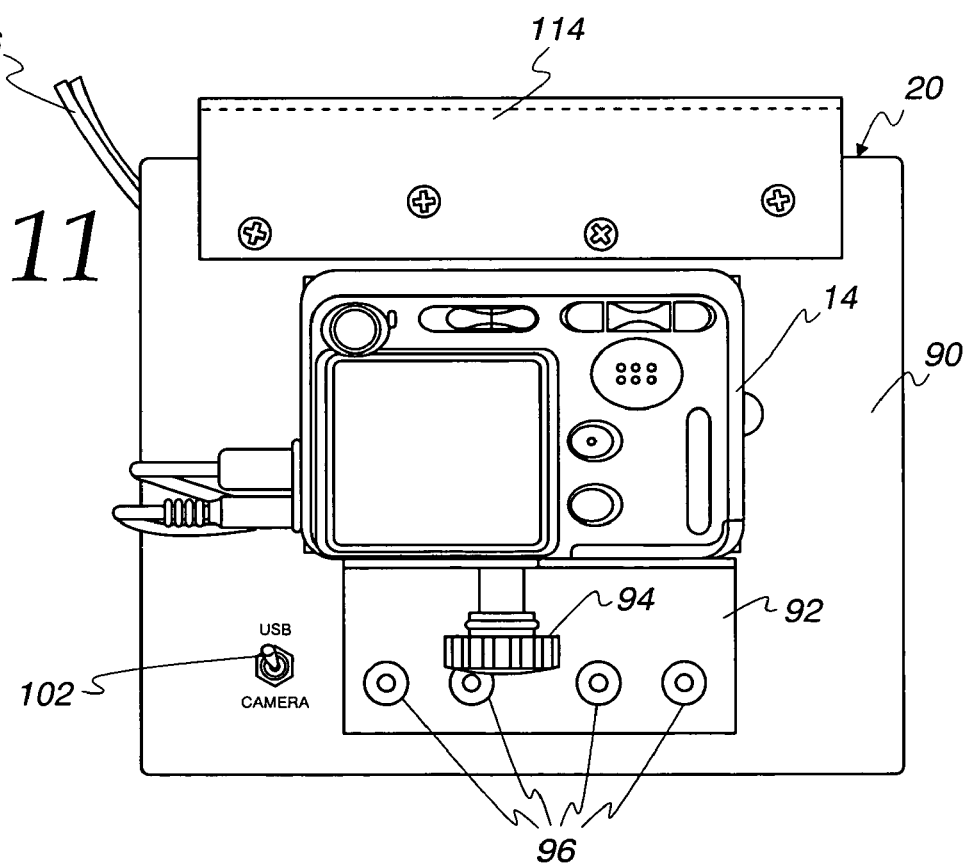
FIG. 11 is a top plan view thereof.

Turning now to FIGS. 10-14 and initially to FIG. 11, cradle assembly 20 provides a convenient mounting for camera 14 to support the camera, hold the camera rigid while taking exposures and aligning the camera with regard to the film(s) being copied. Included is a platform 90, a mounting bracket 92, a knob fastener 94 for securing camera 14 to bracket 92, and a plurality of threaded fasteners 96 for securing bracket 92 to platform 90. Cables 16 connect camera 14 to external devices such as a power supply for operating the camera, and a digital storage medium for storing exposures taken by the camera. An optional switch 102 controls the output of camera 14 which preferably comprises a series of digital signals representing the exposures taken by the camera.

Figure 12:
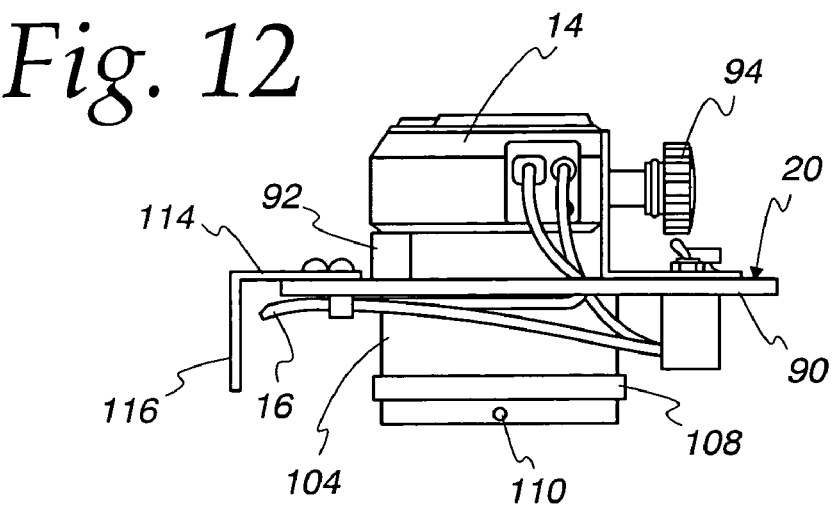
FIG. 12 is a side elevational view thereof.
Figure 13:
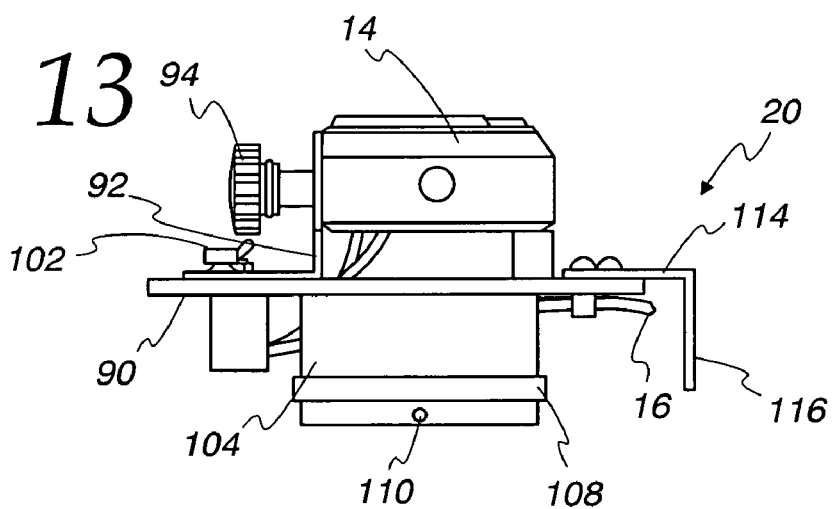
FIG. 13 is an elevational view thereof taken from another side.

With reference to FIGS. 12 and 13, cradle assembly 20 further includes a mounting collar 104 which is hollow, as can be seen for example in FIG. 10. Collar 104 is aligned with an opening in platform 90 to allow unobstructed imaging of lens 106 of camera 14 (see FIG. 10). Mounting collar 104 preferably includes a stepped border 108 and a pair of spring loaded catches 110 to releasably retain shrouds fitted to mounting collar 104. For example, with additional reference to FIG. 3, stepped border 108 is mated with upper end 60 of shroud 58, with catches 110 engaging upper end 60 so as to hold the shroud captive with the cradle assembly in the manner indicated for example in FIG. 1.

In practice, either the stepped border 108 is inserted within the upper end of shroud 58 or the shroud is fitted to the stepped border 108 of mounting collar 104. For example, with the cradle assembly fitted to shroud 58 and the shroud, in turn, keyed with film holder 44, a first embodiment of a film copy system according to the present invention, is completed. In this first embodiment, neither the cradle mount assembly 22 or the support 26 is required. It is preferred, however, that the film holder 44 be associated with an illumination source, such as light source 30.

Figure 14:
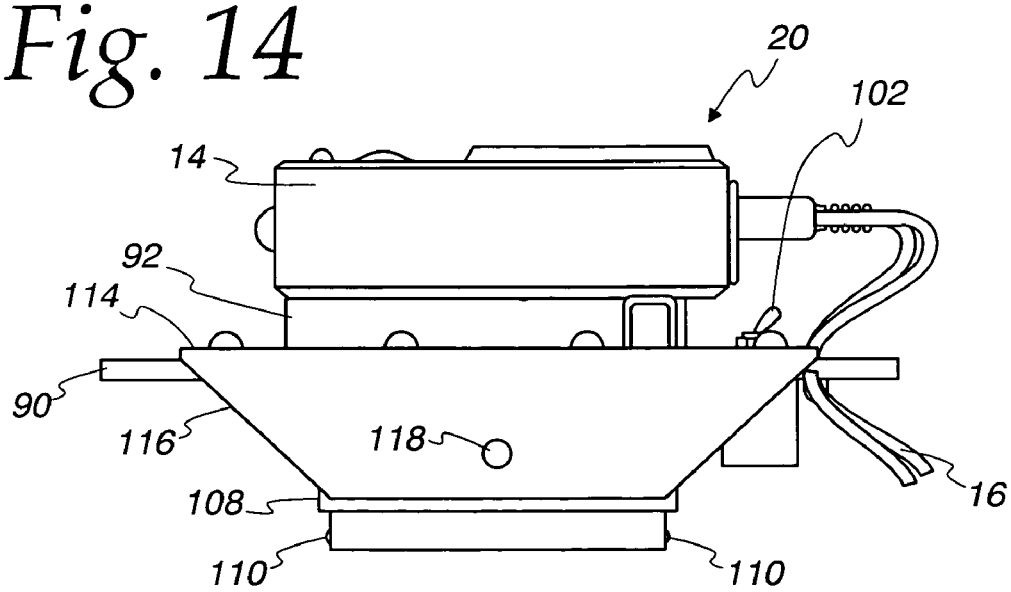
FIG. 14 is a rear elevational view thereof.
Figure 22:
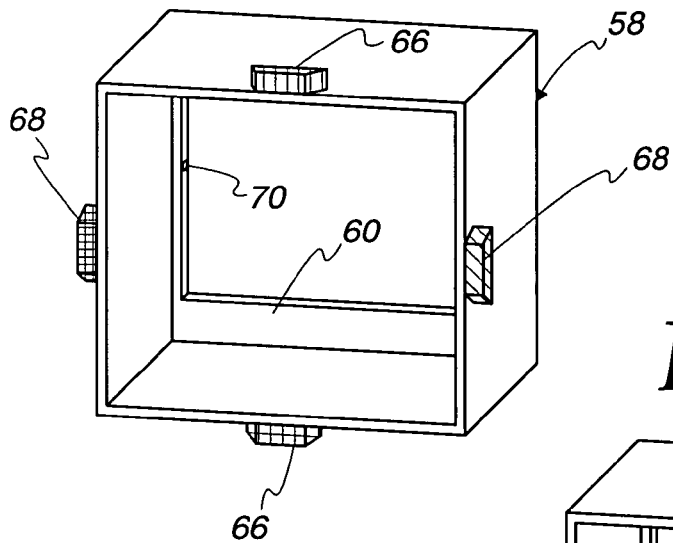
FIG. 22 is a perspective view of a first light shaft.
Figure 24:
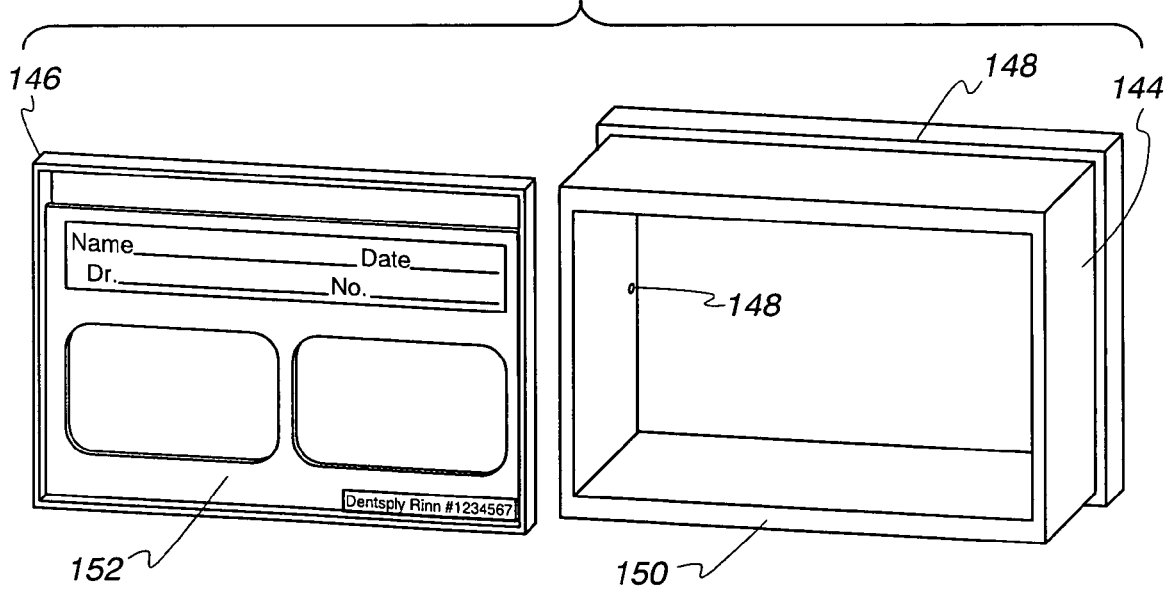
FIG. 24 is a perspective view of a third light shaft along with a film holder assembly.

Turning now to FIGS. 1 and 3, a further embodiment of a film copy system according to the present invention utilizes support 26 to associate camera 14 with either shroud 58 and film holder 44 or with other shrouds and film holders as will be described herein. As can be seen in FIG. 22, a recess 70 is provided in upper end 60 to engage the edges 10 shown for example in FIGS. 12-14. As can be seen in FIG. 24, shroud 144 is provided with recesses 148 to engage catches 110 of mounting collar 104. Referring to FIGS. 10 and 14, cradle assembly 20 includes an option mounting bracket 114 which, as can be seen in FIG. 14, includes a trapezoidal tongue 116. With additional reference to FIGS. 15-17 and initially to FIG. 17, cradle mount assembly 22 is shown mounted to a back 120 of support 26. Cradle mount assembly 22 includes a body 124 having a wall 126 which carries a mounting strap 128 which is spaced from wall 126 so as to form therewith a slotted opening for receiving tongue 116 (see FIG. 14).

Figure 15:
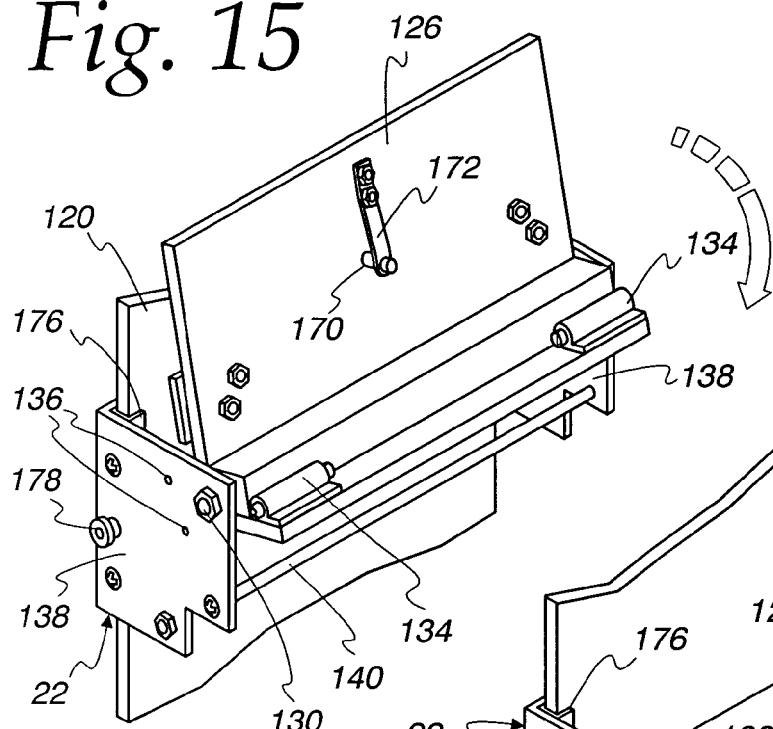
FIG. 15 is a fragmentary perspective view of the camera hinge assembly shown in a first position.
Figure 16:
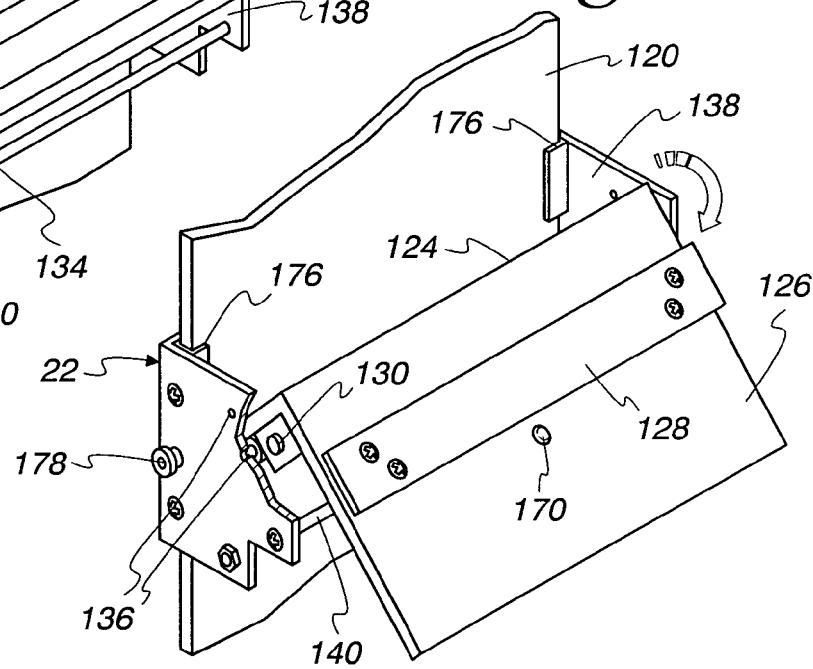
FIG. 16 is a fragmentary perspective view thereof shown in an intermediate position.
Figure 17:
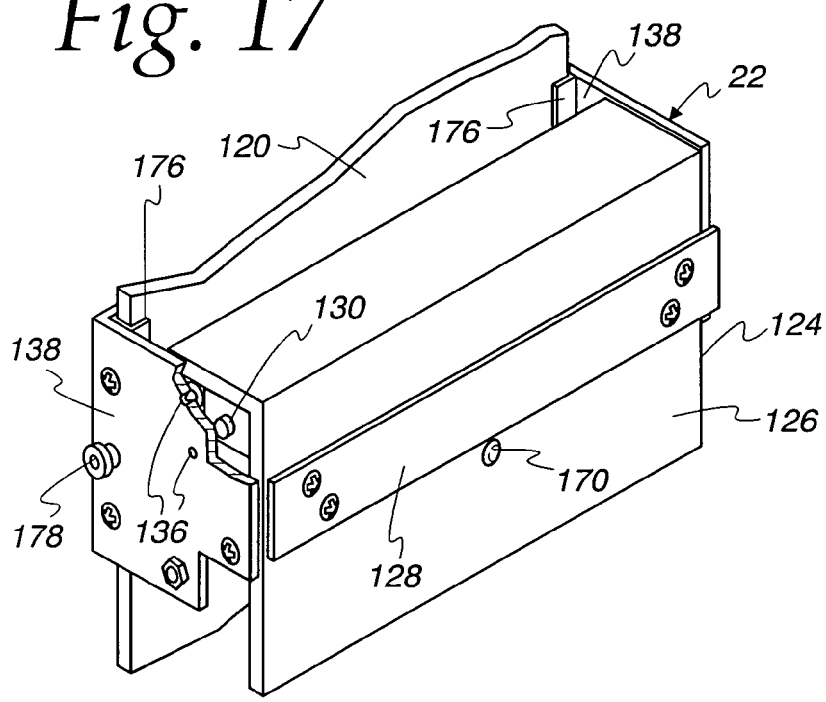
FIG. 17 is a fragmentary perspective view thereof shown in an operating position.

As indicated in FIGS. 15-17, body 124 is pivotally mounted at 130 for rotation between the operational position indicated in FIG. 17, an intermediate position illustrated in FIG. 16 and a fully upright position illustrated in FIG. 15 (shown for purposes of description only). In practical use, it is generally preferred that cradle mount assembly 22 be operated in either of the positions illustrated in FIG. 16 or 17. Referring briefly to FIG. 15, spring-loaded catches 134 are received in detents or holes 136 formed in end plates 138, to define the preferred operating positions indicated in FIGS. 16 and 17. For example, as shown in the intermediate or raised operating position of FIG. 16, the spring-loaded catch is mated with the lower hole 136 whereas, in the fully lowered operating position illustrated in FIG. 17, the spring-loaded catch is mated with the upper hole 136.

Figure 2:
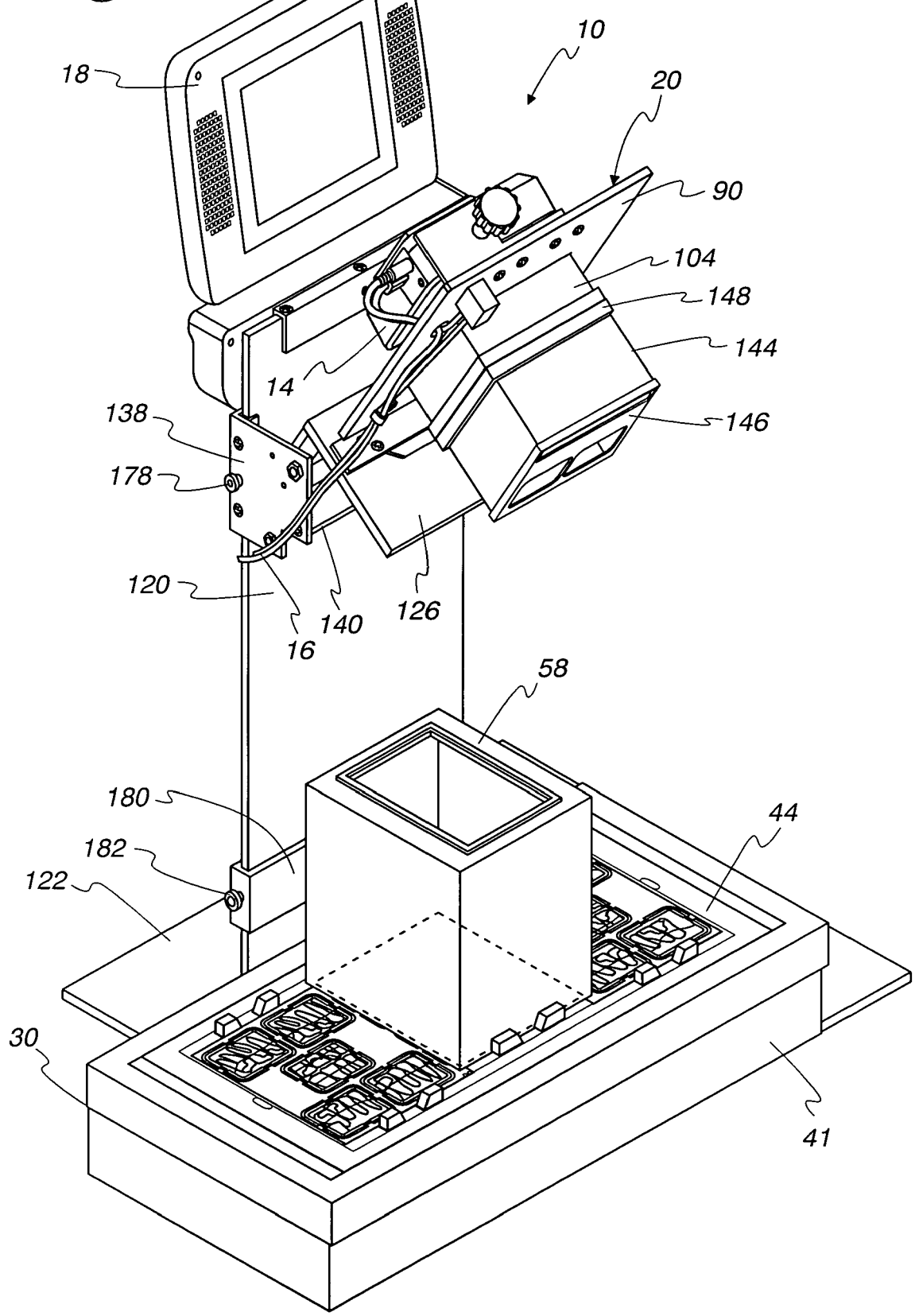
FIG. 2 is a perspective view of the film copy system with a camera cradle assembly in a retracted position.
Figure 18:
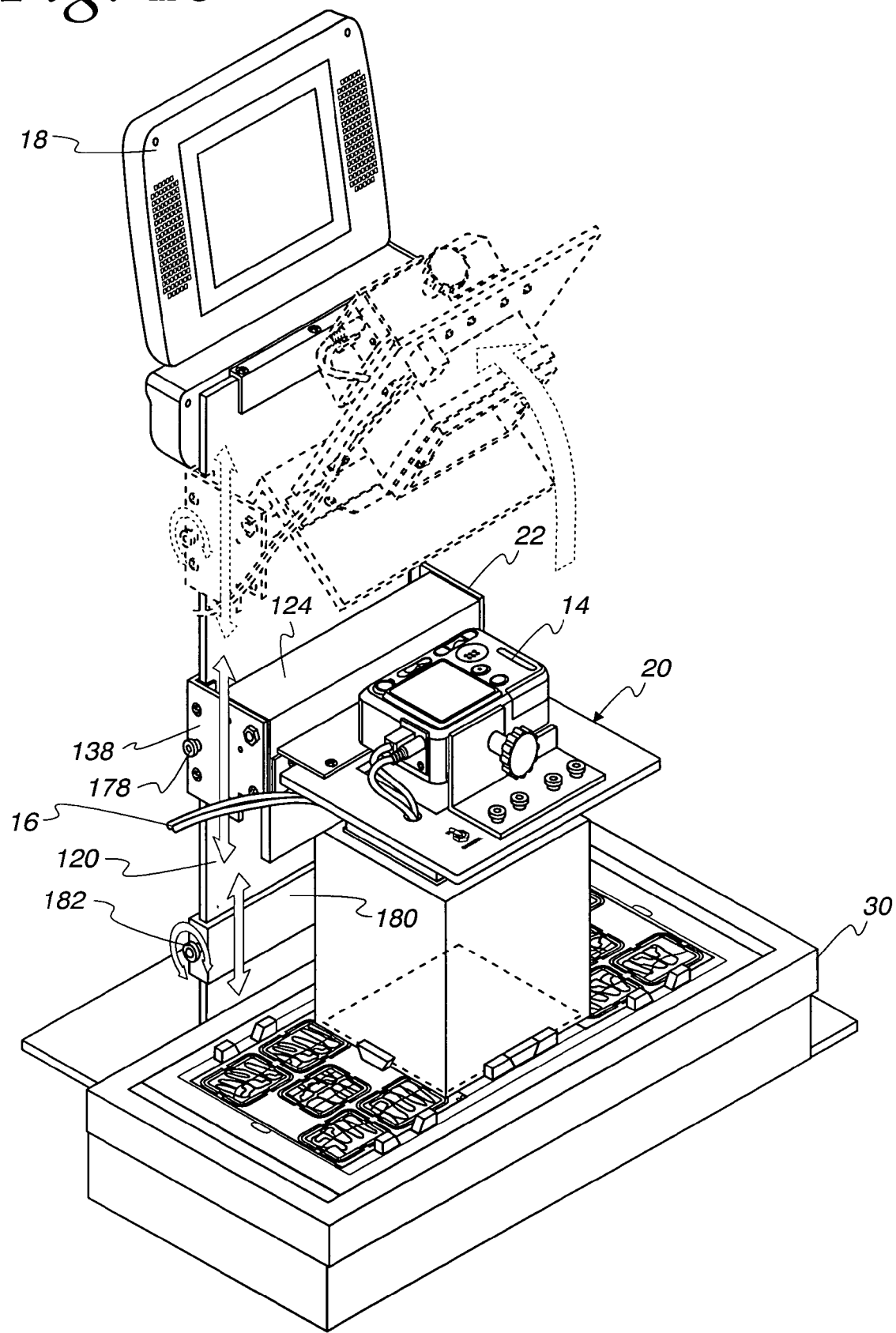
FIG. 18 is a perspective view showing adjustment features of the film copy system.

A stop rod 140 visible in FIGS. 2, 15 and 16 contacts wall 126 to further define the lowered operating position illustrated in FIG. 17 as well as in FIGS. 1 and 18, for example. The intermediate position of body 124 (or the raised operating position for the film copy position) is illustrated in FIGS. 2 and 16.

In FIG. 2, a shroud 144 and a film holder 146 illustrated in FIG. 24 is fitted to mounting collar 104. As can be seen in FIG. 24, shroud 144 has a stepped end 148 for engaging mounting collar 104 and an opposed, bottom end for receiving film holder 146. In FIG. 24, a film holder 152 is shown inserted in film holder 146. As can be seen in FIG. 24, film holder 152 provides mounting for a laterally opposed pair of radiographic films of the type shown for example in FIG. 21. As can be seen for example in FIG. 24, film holder 152 can be conveniently provided with pre-assigned indicia such as the name of the patient, the name of the doctor, the control number identifying the particular films involved and the date when the films were taken. With the arrangement of the present invention, a record is automatically made of this indicia along with a copy of the films.

Figure 25:
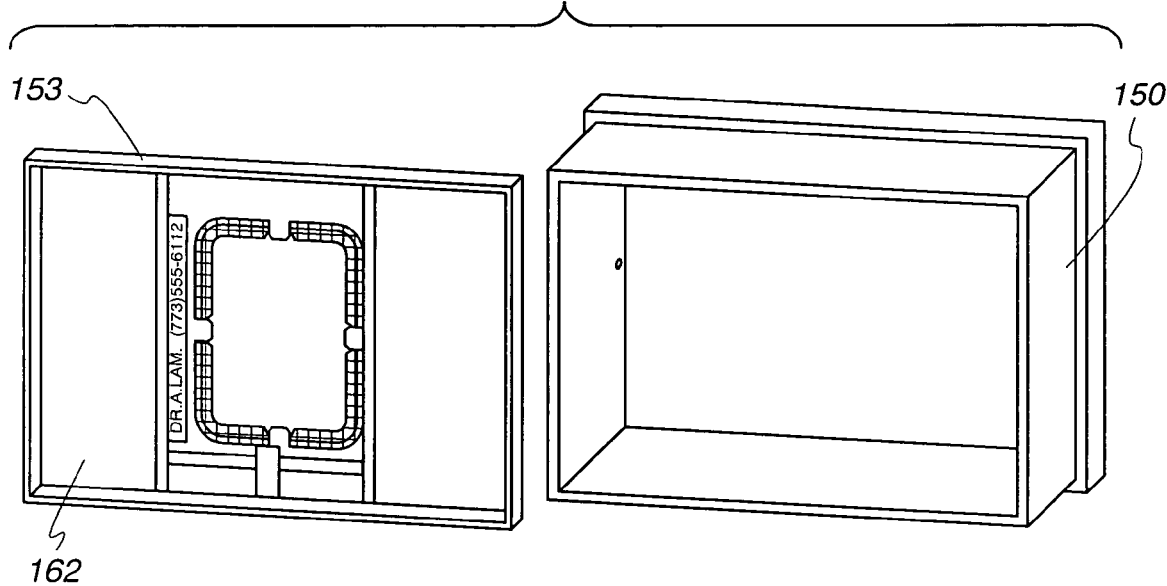
FIG. 25 is a perspective view of the light shaft of FIG. 24, with an alternative film holder.
Figure 26:
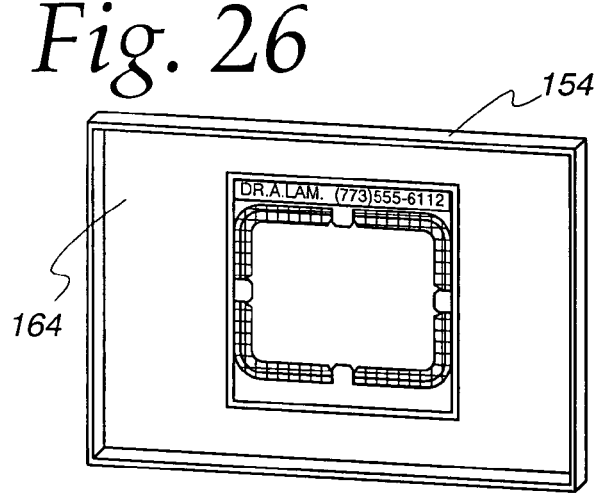
FIG. 26 is a perspective view of another film holder.
Figure 27:
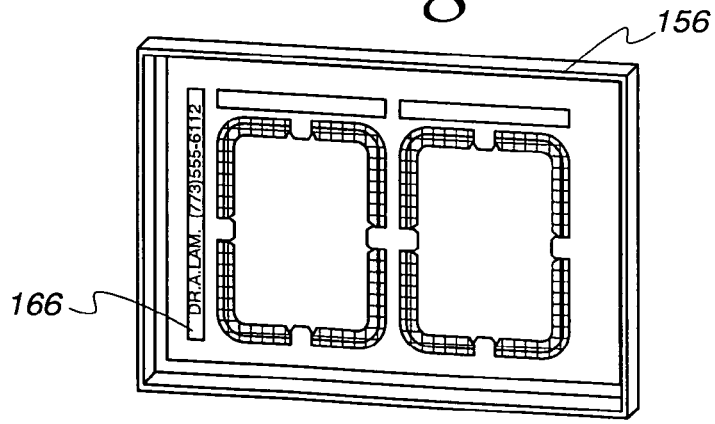
FIG. 27 is a perspective view of another alternative film holder.

Referring to FIGS. 25-27, an alternative film holding system is illustrated comprising shroud 150 and film holders 153, 154 and 156 containing film mounts 162, 164 and 166, respectively. Films such as the radiographic films 36 described above are inserted in the respective film mounts 162, 164 and 166. As shown, convenient measuring grids are provided in each of the film mounts. As illustrated, the film mounts contain identifying indicia which is recorded along with the contents of the radiographic films when an exposure is taken by camera 14. In use, shroud 150 is fitted to mounting collar 104 in the manner illustrated in FIG. 2. If ambient light is sufficient to discern the necessary detail in the radiographic images, camera 14 can be operated in virtually any position, including the tilted position illustrated in FIG. 2. If, however, greater illumination is required, it is generally preferred that the camera and cradle assembly be lowered until film holder 146 is resting on or placed closely adjacent to the upper window of light source 30.

According to certain aspects of the present invention, camera 14 and cradle assembly 20 can be supported in a variety of different positions, with vertical translation and rotation about a horizontal axis. Referring to FIGS. 15-17, cradle assembly 20 is pivotally mounted at 130 so as to rotate about a horizontal axis, as shown. Referring to FIG. 15, a catch 170 is mounted in wall 126 and is biased in an outward direction by leaf spring 172. The tip or free end of catch 170 can be seen, for example, in FIGS. 16 and 17 located adjacent mounting strap 128 and the pocket created between mounting strap 128 and wall 126. As mentioned, tongue 116 shown for example in FIGS. 12-14 is inserted between wall 126 and mounting strap 128 so as to be held captive therein. The captive mounted position of tongue 116 is preferably maintained by engagement of catch 170 with depression 118 formed in tongue 116. In this manner, cradle assembly 20 is securely supported during the tilting operations, where the cradle assembly is moved between the tilted position illustrated, for example, in FIG. 2 and the lowered position illustrated, for example, in FIG. 1.

Referring again to FIGS. 15-17, cradle mount assembly 22 also provides cradle assembly 20 with a controlled, supported translation movement in a vertical direction. End plates 138 include sliding channels 176 which engage the vertical edges of back 120, in the manner illustrated in FIGS. 15-17. Locking screws 178 are inserted through end plates 138 and sliding channels 176 so as to engage the vertical lateral edges of back 120 to lock cradle mount assembly 22 at a desired vertical position. For example, a cradle mount assembly 22 and hence the cradle assembly 20 is shown in FIG. 1 in a vertically lowered position and in FIG. 2 in a vertically raised position. Locking screws 178 maintain the cradle mount assembly and the cradle assembly at their desired vertical positions and, when released, the cradle mount assembly is free to slide along back 120.

Referring to FIGS. 1, 2 and 18, a vertical stop member, preferably in the form of a collar encircling back 120, is locked in a desired vertical position by screw locks 182. When the screw locks 182 are loosened, stop member 180 is free to move in vertical directions about back 120. With vertical stop member 180 locked in a desired vertical position, a quick and easy vertical alignment of camera 14 can be readily obtained. It is possible in certain modes of operation to release locking screws 178 so as to allow cradle mount assembly 22 to be free sliding, with the cradle assembly coming to rest at a desired vertical position when the end plates 138 and/or the sliding channels 176 contact stop member 180. The cradle assembly can then be temporarily raised by manual pressure to allow the films to be exchanged or repositioned, as may be required while taking a series of exposures in a film series.

Figure 23:
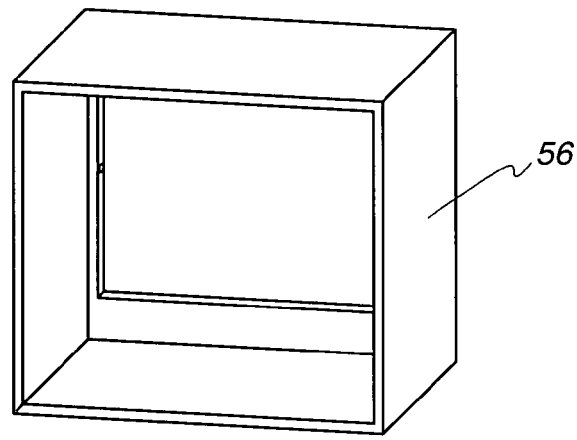
FIG. 23 is a perspective view of a second light shaft.

Referring to FIG. 23, an optional shroud 56 includes an upper wall for attachment to mounting collar 104 in the manner described above with reference to shroud 58. The optional shroud 56 lacks index numbers and may be formed, for example, from opaque material such as opaque plastic or metal, but could also be formed from transparent or translucent material, as desired.

In use, camera 14 may be deployed in a first position illustrated in FIG. 1 where cradle assembly 20 is supported by cradle mount assembly 22 and by shroud 58 which in turn rests on film holder 44 which is supported by light source 30. In this instance, spacing between the camera 14 and the film being copied is provided by shroud 58 and accordingly vertical stop 180 is not required. FIG. 1 illustrates the camera in position for copying a centrally located group of films 36. As mentioned, the cradle assembly 20 could be separated from the cradle mount assembly so as to receive support solely from shroud 58, with accurate registration being provided by the mounting of the shroud to the cradle assembly and by the index guides on the shroud and frame holder.

When copying of a different group of x-rays is desired, the cradle assembly is lifted off of shroud 58. When the cradle assembly is supported by cradle mount assembly 22, locking screws 178 are loosened to allow the cradle mount assembly to be raised in a vertical direction, sliding along back 120. Preferably, shroud 58 remains connected to cradle assembly 20 by operation of catches 110 shown, for example, in FIGS. 12-14. If desired, however, cradle assembly 20 could be disengaged from shroud 58 to allow a vertical separation between the two members. If copying of a different group of films mounted in the same film holder is desired, shroud 58 is then repositioned and re-indexed using outlying pairs of index guides on film holder 44 as explained above. If another "full mouth" film is to be copied, the film mount 12 is exchanged in the manner illustrated in FIG. 20 and frame 44 is closed, as indicated in FIG. 21, and placed on light source 30. Thereafter, cradle mount assembly 22 is lowered so as to lower cradle assembly 20 on shroud 58. If desired, as mentioned, cradle assembly 20 can be supported solely by shroud 58 in preparation for copying the desired films.

If copying of a smaller number of films is desired, the shrouds and film holders illustrated in FIGS. 24-27 are used, with the shroud mounted to mounting collar 104 in the manner indicated in FIG. 2, for example. Preferably, shroud 58 and film holder 44 are removed from the arrangement illustrated in FIG. 2, and cradle assembly 20 is rotated to the lowered position illustrated, for example, in FIG. 1, bringing the film holder carried by the cradle assembly in close proximity to the light source 30. According to one aspect of the present invention, the cradle mount assembly 22 can be lowered so that the film holder is raised slightly above the light source 30, with sufficient clearance to allow the cradle assembly to be rotated to the position illustrated in FIG. 2, for example, allowing a different set of films to be placed in the film holder, without requiring upward translation of the cradle mount assembly. Accordingly, these and other operations made possible by the present invention allow a variety of copying operations to be quickly and easily performed so as to accommodate a wide range of films.

As can be seen from the above, the present invention provides a number of important advantages. For example, copying systems according to principles of the present invention produce results in a much shorter time than scanner-based systems. Advantages are obtained, in part, because the scan time required for scanner-based systems is replaced in the present invention by the nearly instantaneous shutter deployment. Further, light sources used with the present invention are easily replaceable for repair, for change in intensity or color of illumination. If desired, a smaller light source can be employed to illuminate a desired portion of a large format display. Also, cropping and aligning small portions of a large format is quickly achieved using simple, mechanical techniques easily mastered by the staff of a healthcare professional, for example. Masking can be quickly and easily provided for a number of different film formats with the film holders being readily replaceable to allow for different copy formats or to provide identifying indicia as part of the copy image. Further, the cradle assembly provided by the present invention allows quick and easy exchange of cameras and other on-board imaging systems to provide different resolutions, film storage capacities or different exposure effects, as may be desired.

In addition, it can be seen that the film copying system according to principles of the present invention is readily adaptable for use with a wide variety of different film types encountered in the healthcare field, and in other commercially important fields of endeavor. If desired, a film copying system described herein can be employed with a printer for high resolution output or a modem for transmitting digital images to remote locations. These and other advantages of the present invention can be found in the accompanying description as well as the following claims.

The foregoing description and the accompanying drawings are illustrative of the present invention. Still other variations in arrangements of parts are possible without departing from the spirit and scope of this invention.

What is claimed is:

1. A film copy system comprising:
   a base;
   a camera;
   a cradle mount slidably supported by the base,
   a cradle for supporting the camera, removably attached to the cradle mount;
   a film holder;
   a light shaft carried by the cradle, for releasably engaging the film holder, and spacing the film holder a predetermined distance from the camera; and
   wherein the film holder and the light shaft include cooperating index guides to align the film holder to the light shaft.

2. The film copy system of claim 1 wherein the cradle mount engages the cradle for rotation with respect to the base.

3. The film copy system of claim 1 wherein the cradle and the cradle mount include first and second releasably engageable attachments.

4. The film copy system of claim 3 wherein the first and second releasably engageable attachments comprise interfitting plug and socket members.

5. The film copy system of claim 4 further comprising detents on one of said plug and said socket members to define rotational positions.

6. The film copy system of claim 1 wherein the base includes a bottom support and a back slidably supporting the cradle mount, and the cradle mount includes a lock for locking the cradle mount at a point along the back.

7. The film copy system of claim 6 further comprising a slide stop movable along the back and including a lock for locking the slide stop at a point along the back.

8. The film copy system of claim 7 wherein the slide stop comprises a collar.

9. The film copy system of claim 1 wherein the cradle comprises a platform defining an aperture and a bracket for mounting the camera to the platform, aligned with the aperture.

10. A film copy system comprising:
    a base;
    a camera;
    a mounting member for rotatably and slidably mounting the camera to the base;
    a film holder;
    a light shaft carried by the mounting member, for releasably engaging the film holder, and spacing the film holder a predetermined distance from the camera; and
    wherein the film holder and the light shaft include cooperating index guides to align the film holder to the light shaft.

11. The film copy system of claim 10 wherein the mounting member comprises a cradle for supporting the camera, including a first removable attachment, and a cradle mount supported by the base and having a second removable attachment for releasable engagement with the first removable attachment, to support the cradle.

12. The film copy system of claim 11 wherein the cradle mount mounts the cradle for rotation with respect to the base.

13. The film copy system of claim 11 wherein the first and the second removable attachments comprise interfitting plug and socket members.

14. The film copy system of claim 13 further comprising detents on one of said cradle mount and said base to define rotational positions.

15. The film copy system of claim 11 wherein the base includes a bottom support and a back slidably supporting the cradle mount, and the cradle mount includes a lock for locking the cradle mount at a point along the back.

16. The film copy system of claim 11 wherein the cradle comprises a platform defining an aperture and a bracket for mounting the camera to the platform, aligned with the aperture.

17. A film copy system comprising:
    a camera;
    a film holder;
    a cradle comprising a platform defining an aperture and a bracket for mounting the camera to the platform, aligned with the aperture;
    a light shaft carried by the cradle so as to be aligned with the aperture, for releasably engaging the film holder, and spacing the film holder a predetermined distance from the camera; and
    the film holder and the light shaft including cooperating index guides to align the film holder to the light shaft.

18. The film copy system of claim 17 wherein the index guides include inclined mating surfaces, with the index guides of one of said film holder and said light shaft including at least one pair of spaced apart index guides defining a pocket for receiving an index guide of the other of said film holder and said light shaft.

* * * * *

UNITED STATES PATENT AND TRADEMARK OFFICE
CERTIFICATE OF CORRECTION

PATENT NO.       : 7,933,513 B2                                               Page 1 of 1
APPLICATION NO.  : 11/497591
DATED            : April 26, 2011
INVENTOR(S)      : Anthony Lam It is certified that error appears in the above-identified patent and that said Letters Patent is hereby corrected as shown below:

In the Specification:

Column 5, line 64, "to engage the edges 10" should be --to engage the edges 110--

Signed and Sealed this
Twenty-eighth Day of June, 2011

David J. Kappos
*Director of the United States Patent and Trademark Office*